United States Patent Office 3,703,467
Patented Nov. 21, 1972

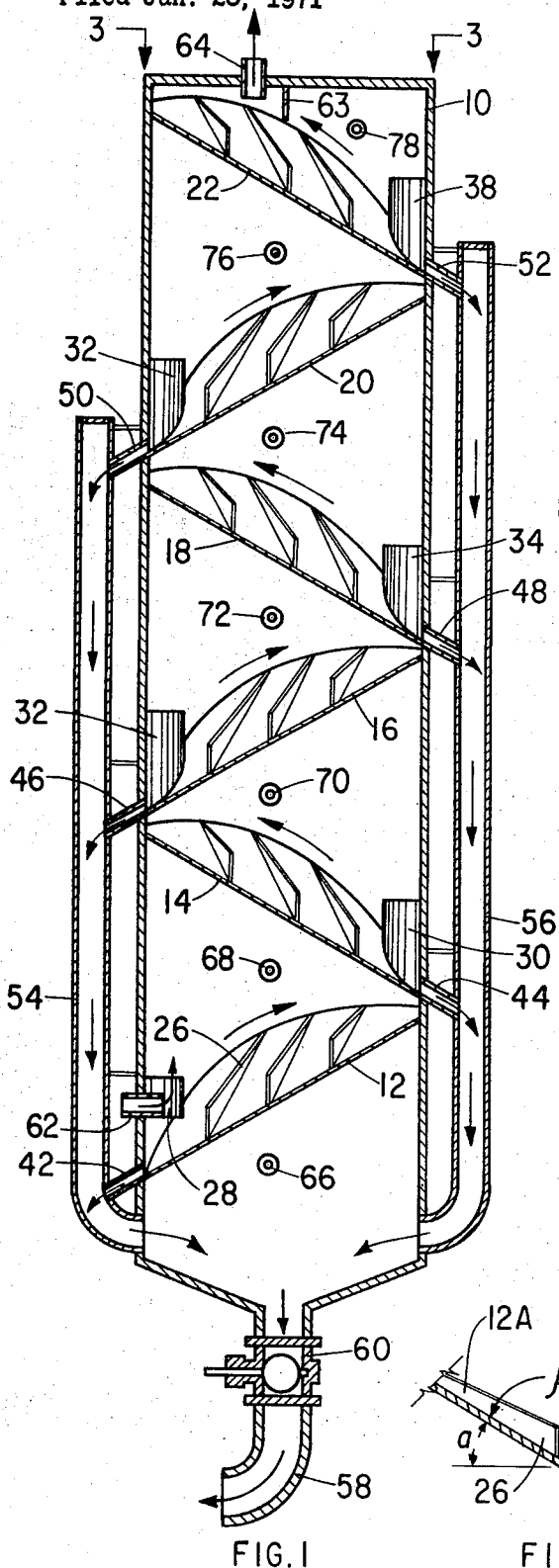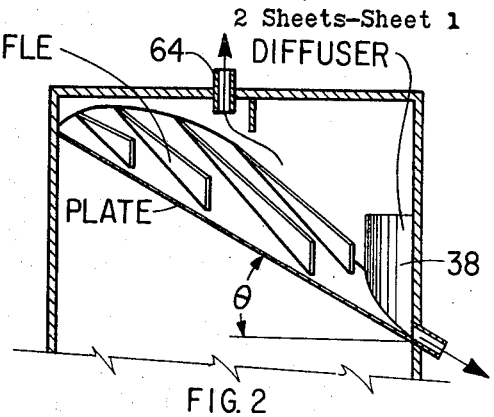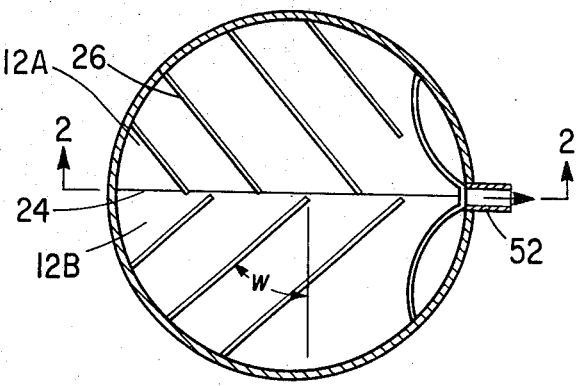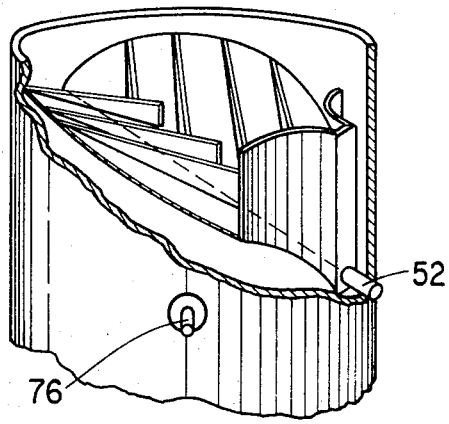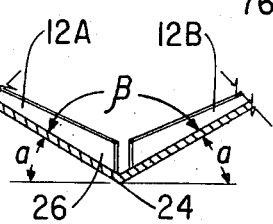
INVENTORS
JAMES L. LUMMUS
BY LEROY J. FIELD
John D. Gassett
ATTORNEY

---

3,703,467
VERTICAL SEPARATOR FOR DRILLING FLUIDS
James L. Lummus, Tulsa, Okla., and Leroy J. Field, Calgary, Alberta, Canada, assignors to Pan American Petroleum Corporation, Tulsa, Okla.
Filed Jan. 28, 1971, Ser. No. 110,425
Int. Cl. B01d 21/10
U.S. Cl. 210—522                    9 Claims

ABSTRACT OF THE DISCLOSURE

This invention relates to a separator for removing cuttings from drilling fluid. This separator has a series of inclined flow plates inside a vertical tank. The flow planes or plates are zigzagged, that is, adjacent plates are inclined in opposite direction. Each plate is provided with vertical, slanting baffles. The flow path of the solids carrying drilling fluid begins at the bottom and flows up over each plate and baffle system and out the outlet at the top. Each plate is provided with a drain at its lower end for removing trapped solids.

BACKGROUND OF THE INVENTION

Field of the invention

This invention relates to a separator for removing finely divided solids from a liquid. It particularly concerns a vertical separator for removing cuttings carried in the drilling mud or circulating fluid of a well drilling system.

Setting of the invention

Although this invention can be used for removing solids from a liquid in many varied systems, it is intended for its primary use to be used for removing solids from a circulating drilling fluid. The most common method of drilling oil and gas wells is the rotary drilling method. In this system a bit is attached to the lower end of a hollow string of drill pipe. A drilling fluid is circulated down the interior of the drill pipe through the bit to the bottom of the well bore where it picks up cuttings. The drilling fluid then carries the cuttings up the annulus between the drill pipe and the well bore to the surface. This driling fluid takes on many and varied aspects. It nearly always has material such as bentonite added to the main liquid which usually is water. One important reason for adding materials to the water is to increase the density to keep formation fluids from flowing into the well. Many other additives are added to the drilling fluid for other reasons which are well known to the drilling engineer. This drilling fluid is expensive and is therefore recirculated through the drilling system. This re-use of the drilling fluid also minimizes the disposal problem.

Before the drilling fluid is recirculated down the drill string, efforts are made to remove the cuttings from the drilling fluid. The more cuttings that are removed, the more efficient the drilling operation. There are many devices on the market for removing such cuttings in drilling fluid. The large rock particles are relatively easily removed. However, the present particle removal systems all have certain shortcomings such as being expensive or removing only a small percent of the fine cuttings. Thus, there is a need for a simpler, more economical and more efficient way of removing such cuttings. This invention provides such a system. The particular cuttings with which this invention is primarily concerned are rock particles in the size of about 20 mesh ($841\mu$) to about 1250 mesh ($10\mu$).

BRIEF SUMMARY OF THE INVENTION

This invention relates to a separator for removing fine rock cuttings from drilling fluid. This separator has a series of inclined flow plates inside a vertical tank and extending completely across such tank. The flow planes or plates are zigzagged, that is, the adjacent planes are inclined in opposite directions. Each plate is provided with baffles. The solids carry fluid and flow along a path which begins at the bottom and flows up over each plate and baffle system and the outlet is at the top. Each plate is provided with a drain at its lower end for trapped solids.

BRIEF DESCRIPTION OF THE DRAWINGS

FIG. 1 is a cross-sectional view of the preferred embodiment of the vertical separator of this invention.

FIG. 2 is an enlarged portion showing the upper plate of the apparatus of FIG. 1 and of the baffles shown in perspective.

FIG. 3 is a cross-sectional view along the line 3—3 of FIG. 1.

FIG. 4 is a cutaway isometric fragmentary view of a vertical portion of the separator.

FIG. 5 is a fragmentary sectional view taken along the line 5—5 of FIG. 1 to illustrate the angle between plate sections of each plate.

DETAILED DESCRIPTION OF THE INVENTION

Figure 6:
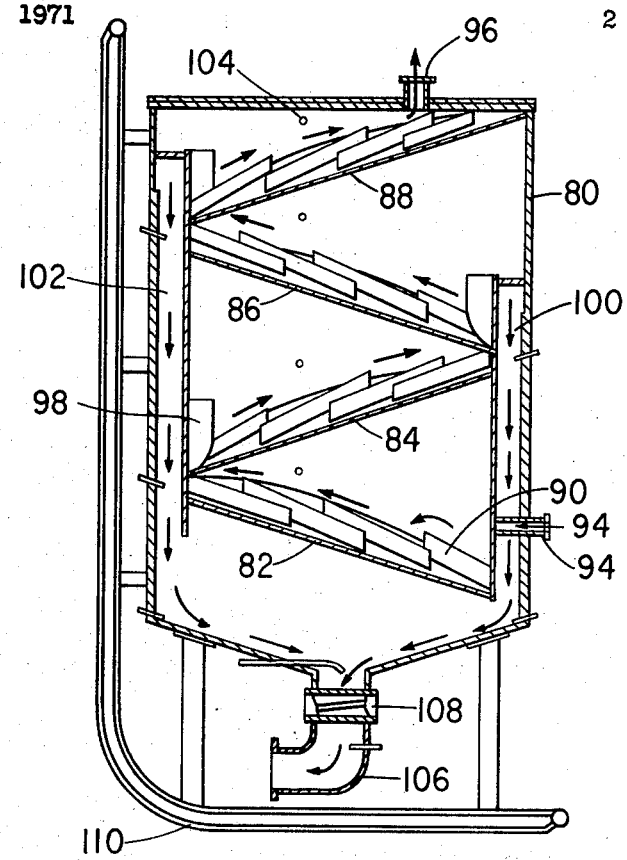
FIG. 6 is a cross-sectional view of an other embodiment of a vertical separator.

Attention is first directed to FIG. 1 which shows the preferred embodiment of this invention. This figure illustrates a vertical cylinder or housing 10 which comprises the main housing of the separator. Within housing 10 there are a plurality of plates or flow planes 12, 14, 16, 18, 20 and 22. Each plate is comprised of two sections as shown in FIG. 5 and includes sections 12A and 12B which are merged together as by welding at line 24. The edges of these sections are welded or otherwise sealed with the interior wall of the housing 10. Each plate, 12A and 12B, makes an angle $\alpha$ with a horizontal line through line 24, see FIG. 5. According to our experiments the best angle for $\alpha$ is about 25°. Angle $\beta$ then is the angle between the plate sections 12A and 12B and is equal to 180° minus $2\alpha$. Plate 12 is inclined or sloped at an angle $\phi$ as shown in FIG. 2. The best angle for this plate slope has been found to be about 20°.

Each plate sections, 12A and 12B, has a plurality of baffles 26. Each baffle makes an angle $\omega$ with a line perpendicular to line 24 as shown in FIG. 2. It is believed that the best angle for $\omega$ is about 45°. As can be seen in FIG. 3, the ends of the baffles adjacent line 24 are not aligned, but are spaced preferably midway between the ends of the baffles on section 12A.

Each baffle plate 12, 14, 16, 18, 20 and 22 has an associated vertical flow trough or diffuser 28, 30, 32, 34, 36 and 38, respectively. The purpose of the flow trough is to provide fluid communication, i.e., a fluid flow path from beneath its associated plate to above it. The cross-section area of the flow trough should be about $\frac{1}{20}$ of the cross-section area of the tank to allow adequate passage of fluid from one section to the other. It has been found that the height of the flow trough should be about two feet and should be level with the center of the flow plate. A particularly desirable height for the baffles for the most common drilling muds and cuttings is believed to be around twelve inches.

As can be seen in FIG. 1, alternating flow plates are inclined in opposite directions. As described above, each flow plate is provided with a diffuser for permitting flow from beneath the plate to above it. Each flow plate must likewise be provided with a drain for draining off the settled cuttings. Accordingly, plates 12, 14, 16, 18, 20 and 22 are provided with the cuttings drains 42, 44, 46, 48, 50 and 52, respectively. These cuttings drains ports are clearly shown in FIG. 4. As shown in FIG. 1, those drainage ports shown on the left are connected into a vertical drainage pipe 54 and those on the right side into drainage pipe 56. These drainage pipes merge into the space below plate 12. The drainage material can be removed through outlet 58 having valves 60.

The fluid inlet for the drilling mud to be processed is through inlet 62 which directs fluid into diffuser 28 above plate 12. The outlet of the process fluid is through outlet 64 in the top of tank 10. A vertical deflector 63 is supported from the top between the diffuser 38 and outlet 64.

Water jets 66, 68, 70, 72, 74, 76 and 78 are provided for cleaning the system.

Having described the structural features of the embodiment of FIGS. 1 through 5, attention will now be directed briefly to the flow path of the drilling fluid carrying the cuttings and the cuttings removal path. The fluid carrying the cuttings to be removed is first treated with a flocculating agent. The art of selecting suitable flocculating agents is well known. The fluid is then directed into inlet 62 where the fluid flows out over plate 12 and its associated baffle plates. A part of the solids are removed by plate 12 and settled along the plate and baffles. The circulating fluid then flows up through diffuser 30 to a plate 14 where additional cuttings are removed in the same manner as by plate 12 and its baffles. This continues up through the various diffusers and by the various plates and baffles until the relatively particle-free fluid is removed through outlet 64.

For a conventional drilling rig and related system, a typical size separator can be a 200 barrel cylinder approximately 15 feet high by 10 feet in diameter. The interior configuration of inclined flow planes and baffles provides settling time and sufficient shear effect for effective solids settling action. Solids will settle automatically and are funneled to the bottom of the tank from which they can be dumped to a collecting medium, not shown.

As solids settle out of the circulated drilling fluid they fall down behind the baffles and slide down angle $\alpha$ to the center of the flow plates. From here the solids slide down each flow plate along angle $\theta$ to the exit tubes 42, 44, 46, 48, 50 and 52. Once in the drainage tubes 54 and 56, the solids can settle unhindered to the bottom of the tank. Solids dumping occurs periodically when valve 60 is opened and they flow through tube 58 to a collecting medium. Dumping is accomplished by the hydrostatic head of the circulated drilling fluid forcing the settled solids out the bottom of the tank. If solids do happen to build up behind the baffles they can be flushed down the flow plates to the drainage pipes by means of jetting water and/or steam through nozzles 66, 68, 70, 72, 74, 76 and 78.

Attention is next directed to FIG. 6 for a slightly different embodiment of the separator of this invention. Shown thereon is a vertical cylinder 80 having a plurality of inclined plates 82, 84, 86 and 88. Each of these plates has baffles 90 thereon. Cylinder 80 has an inlet 94 and an outlet 96. There is provided a diffuser 98 between successive plates similarly as flow troughs 28 of FIG. 1 and serves the same function. Drainage tubes 100 and 102 are provided on the inside of the tank to transfer the solids particles from the flow plates to the bottom of the tank. Jets 104 are provided so that water or steam can be jetted onto the flow plates to assist solids flow along these plates to the drainage tubes. Solids flow out outlet 106 under the influence of the hydrostatic head when valve 108 has been opened. In the device of FIG. 6 the whole assembly is mounted on skids 110 so that it can be easily moved.

A plastic model of the solids settling tank was built on the following scale (in relation to a proposed field tank).

| | Proposed field tank | Ratio | Lab tank |
|---|---|---|---|
| Height, inches | 180 | | 54½ |
| Height ratio | | 3.3/1 | |
| Diameter, inches | 120 | | 14 |
| Diameter ratio | | 8.6/1 | |
| Volume, gallons | 8,265 | | 35 |
| Volume ratio | | 236/1 | |
| Settling area, square inches | 45,200 | | 1,040 |
| Settling area ratio | | 43.5/1 | |
| Distance of travel, inches | 708 | | 122 |
| Distance of travel ratio | | 5.8/1 | |
| Time in tank ratio (using volume ratio) | | 1/1 | |

Ten tests were run, four using fabricated muds and six using typical field muds. The tests indicated that the field tank should be operated at around 1000 g.p.m. Also the water can be introduced through the jets 66 etc., into the tank so as to thin the mud and increase settling efficiency. The rate of pumping and water addition depends upon the amount of solids, the ratio of bentonite to drilled solids, the PV, YV and gel strengths and whether or not there is a selective flocculent being used. The bentonite content, total solids content, plastic viscosity, yield point and gel strength of the mud are determined according to API "Recommended Practice Standard Procedure for Testing Drilling Fluids," API RP 13B, second edition, April 1969. The drilled solids content is total solids less the bentonite solids.

If operated properly, the tank is capable of removing up to 65% of the drilled solids from the mud system. At the very minimum, the removal efficiency should be above 30%. This compares with conventional settling of around 10% of the drilled solids in field mud systems.

While the above invention has been described in detail, various modifications can be made therefrom without departing from the spirit or the scope of the invention.

We claim:

1. A separator for removing solid particles from a fluid which comprises:
    a vertical tank having an inlet toward its lower end and an outlet at its upper end;
    a first inclined flow plate in said tank and having vertical baffles mounted thereon and sloping toward the lower side of said flow plate;
    a second flow plate in said tank above said first inclined flow plate and inclined in the opposite direction from said first flow plate, said second flow plate having vertical baffles thereon and sloping toward the lower side of said second flow plate;
    a flow trough providing fluid communication from below the lower end of said second flow plate to above said second flow plate, there being no other fluid communication;
    a particle drain conduit from the lower end of each said flow plate to the exterior of said vetrical tank;
    said fluid inlet to said vertical tank being adjacent and above the lower portion of said first plate and below said second flow plate and the said outlet from said vertical tank being above said second flow plate.

2. A separator as defined in claim 1 in which each said flow plate includes a first plane portion and a second plane portion making an angle of about 130° with each other.

3. An apparatus as defined in claim 1 in which a line drawn from the highest point of each flow to the lowest point of such plate makes an angle of about 20° with a horizontal plane.

4. An apparatus as defined in claim 1 in which each plate means is comprised of two plate portions which intersect in a line and this line forms an angle of about 25° with a horizontal plane.

5. An apparatus as defined in claim 1 is provided with jet nozzles in the wall of said vertical tank above each plate so that clean water can be used to flush settled particles off each plate.

6. An apparatus as defined in claim 4 in which the vertical tank has a diameter of about two-thirds of its height and in which each flow troughs are about two feet high and the baffle plates about twelve inches high at their highest point.

7. An apparatus as defined in claim 4 in which the flow trough extends vetrically to a point about level with the mid-point elevation of its associated flow plate.

8. A separator for removing solid particles from a fluid which comprises:

a vetrical tank having an inlet toward its lower end and an outlet at its upper end;

a first inclined flow plate means mounted in said tank;

second flow plate means above said first flow plate means in said tank and inclined in the opposite direction from said first flow plate means;

a vertical flow trough through the lower end portion of said second flow plate means to provide fluid communication from below the lower end of said second flow plate means to above said second flow plate means;

a particle drain conduit from the lower end of each said flow plate means to the exterior of said vetrical tank;

said fluid inlet to said vertical tank being adjacent to and above the lower portion of said first flow plate means and below said second flow plate means, the said outlet from said vertical tank being above said second flow plate means.

9. A separator as defined in claim 8 in which the top of said vertical flow trough is about level with the center of said second flow plate means.

References Cited

UNITED STATES PATENTS

| | | | |
|---|---|---|---|
| 2,181,686 | 11/1939 | Walker | 210—522 X |
| 3,225,936 | 12/1965 | Ballestra | 210—521 X |
| 2,167,160 | 7/1939 | Raymond | 210—521 X |

REUBEN FRIEDMAN, Primary Examiner

F. F. CALVETTI, Assistant Examiner